United States Patent
Wilczewski

(10) Patent No.: US 8,681,699 B2
(45) Date of Patent: Mar. 25, 2014

(54) CONTENTION MEDIA ACCESS CONTROL FOR TELECOMMUNICATIONS

(75) Inventor: Jeffrey Michael Wilczewski, Rochester, NY (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 13/104,603

(22) Filed: May 10, 2011

(65) Prior Publication Data

US 2012/0287849 A1    Nov. 15, 2012

(51) Int. Cl.
*H04W 4/00*    (2009.01)

(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 5,970,062 A * | 10/1999 | Bauchot | 370/310.2 |
| 6,014,087 A | 1/2000 | Krishnakumar et al. | |
| 6,078,591 A | 6/2000 | Kalkunte et al. | |
| 6,240,083 B1 | 5/2001 | Wright et al. | |
| 6,754,225 B1 * | 6/2004 | Lin et al. | 370/442 |
| 6,980,541 B2 | 12/2005 | Shvodian | |
| 7,095,754 B2 | 8/2006 | Benveniste | |
| 7,127,255 B2 * | 10/2006 | Hsu et al. | 455/452.2 |
| 7,184,413 B2 | 2/2007 | Beyer et al. | |
| 7,274,708 B2 | 9/2007 | Benveniste | |
| 7,447,180 B2 | 11/2008 | Jeong et al. | |
| 7,515,608 B2 | 4/2009 | Yuan et al. | |
| 7,551,578 B2 | 6/2009 | Pollack et al. | |
| 7,567,537 B1 | 7/2009 | Gurbuz et al. | |
| 7,593,449 B2 | 9/2009 | Shattil | |
| 7,664,132 B2 | 2/2010 | Benveniste | |
| 7,760,703 B2 | 7/2010 | Kubler et al. | |
| 7,848,357 B2 | 12/2010 | Eng | |
| 2002/0019966 A1 * | 2/2002 | Yagil et al. | 714/752 |
| 2002/0122409 A1 | 9/2002 | Kandala | |
| 2005/0135409 A1 * | 6/2005 | Janczak | 370/449 |
| 2006/0221993 A1 | 10/2006 | Liao | |
| 2006/0246932 A1 * | 11/2006 | Liang | 455/515 |
| 2008/0002734 A1 * | 1/2008 | Zheng et al. | 370/445 |
| 2008/0013567 A1 * | 1/2008 | Benveniste | 370/447 |
| 2008/0112350 A1 * | 5/2008 | Nanda et al. | 370/312 |
| 2008/0225878 A1 | 9/2008 | Cordeiro et al. | |
| 2009/0213815 A1 | 8/2009 | Sherman et al. | |
| 2009/0279509 A1 * | 11/2009 | Reumerman et al. | 370/335 |
| 2010/0008318 A1 * | 1/2010 | Wentink et al. | 370/329 |
| 2012/0039295 A1 * | 2/2012 | Quan et al. | 370/329 |
| 2012/0201219 A1 * | 8/2012 | Wager et al. | 370/329 |

OTHER PUBLICATIONS

EP Search Report issued in connection with corresponding EP Patent Application No. 12167385.9 dated Aug. 7, 2012.

* cited by examiner

*Primary Examiner* — Otis L Thompson, Jr.
(74) *Attorney, Agent, or Firm* — Hiscock & Barclay LLP

(57) ABSTRACT

A system includes an access point and one or more remotes. The access point is configured for receiving signals, and for transmitting signals comprising contention frames, contention grants, and data frames. The one or more remotes include a first remote configured for receiving signals, and configured for transmitting signals comprising contention requests and data frames. The first remote is configured for transmitting one of the contention requests within a selected period of time after receiving one of the contention frames from the access point. The access point is configured for transmitting one of the contention grants to the first remote after receiving one of the contention requests from the first remote. The first remote is configured for transmitting one of the data frames within a selected period of time after receiving one of the contention grants from the access point.

14 Claims, 3 Drawing Sheets

| MASTER | CF | CP | CG |    | ACK |
|--------|----|----|----|----|----|
| REMOTE |    | CR |    | DF |    |

FIG. 5

| MASTER | CF | CP CONTENTION PERIOD | DF | CF |
|--------|----|----|----|----|

FIG. 6

| MASTER | CF | CP | CF | CP | CF | CP |
|--------|----|----|----|----|----|----|
| REMOTE |    | My_backoff = 2 |    | My_backoff = 1 |    | CR |

FIG. 7

| MASTER | CF SLOT SIZE =4 | CP SLOT 1 | CP SLOT 2 | CP SLOT 3 | CP SLOT 4 | CG |    |
|--------|----|----|----|----|----|----|----|
| REMOTE |    |    |    |    | CR |    | DF |

FIG. 8

| MASTER | CF | CP | DF |    | CF | CP |
|--------|----|----|----|----|----|----|
| REMOTE |    |    |    | ACK |    |    |

FIG. 9

| MASTER | CG |    | CF DS_ACK=1 | CP | CF DS_ACK=0 |
|--------|----|----|----|----|----|
| REMOTE |    | DF |    |    |    |

FIG. 10

CONTENTION MEDIA ACCESS CONTROL FOR TELECOMMUNICATIONS

BACKGROUND OF THE INVENTION

The subject matter disclosed herein relates to media access control for wireless telecommunications.

Media access control systems are typically used for communications systems, such as in industrial wireless communication systems using industrial licensed narrowband radio frequencies. Different media access techniques govern how different radio transceivers time their signals with each other, to ensure that all intended signals are transmitted while avoiding interference or collision between competing signals, excessive delay of signal transmissions, and other communication breakdowns.

At any given time if more than one radio transmits within range of another radio on the same frequency, the transmissions may collide and it is possible for data to become corrupted. Such collisions require the information to be re-transmitted. Additionally, since radio frequency (RF) channels are lossy, there is no guarantee that a channel will successfully deliver information. Random fading, interference, and noise are contributing factors to this.

The discussion above is merely provided for general background information and is not intended to be used as an aid in determining the scope of the claimed subject matter.

BRIEF DESCRIPTION OF THE INVENTION

Systems, methods, and devices are disclosed for contention media access control, in accordance with a variety of illustrative embodiments. An advantage that may be realized in the practice of some disclosed embodiments is to intelligently control media access with a small bandwidth footprint while providing channel access and reliability.

In one illustrative embodiment, a system is disclosed. The system includes an access point and one or more remotes. The access point is configured for receiving signals, and for transmitting signals comprising contention frames, contention grants, and data frames. The one or more remotes include a first remote configured for receiving signals, and configured for transmitting signals comprising contention requests and data frames. The first remote is configured for transmitting one of the contention requests within a selected period of time after receiving one of the contention frames from the access point. The access point is configured for transmitting one of the contention grants to the first remote after receiving one of the contention requests from the first remote. The first remote is configured for transmitting one of the data frames within a selected period of time after receiving one of the contention grants from the access point.

In another illustrative embodiment, a method is disclosed. The method includes the steps of: providing an access point configured for receiving and transmitting signals; providing a plurality of remotes configured for receiving and transmitting signals, the plurality comprising a first remote and a second remote; transmitting a series of contention frames from the access point, defining contention periods between the contention frames; transmitting a contention request from the first remote during one of the contention periods; transmitting a contention request from the second remote during one of the contention periods; if the access point receives one contention request during one of the contention periods, then transmitting a contention grant from the access point to one of the remotes having an address indicated in the one received contention request; if the access point receives more than one contention request during one of the contention periods, then causing the access point to select one of the remotes having an address indicated in one of the received contention requests, and transmitting a contention grant from the access point to the selected remote; if one of the remotes receives a contention grant, then transmitting a data frame from that remote in a contention period subsequent to the contention grant; and if one of the remotes does not receive a contention grant in a contention period subsequent to transmitting a contention request, then causing that one of the remotes to implement a delay prior to sending a new contention request, then transmitting a new contention request from that one of the remotes after passage of the delay.

In another illustrative embodiment, a device is disclosed. The device comprises a receiver, a transmitter, a data input, and a controller. The controller is in communicative link with the receiver, the transmitter, and the data input. The device is configured to receive data via the data input and contention frames via the receiver. The device is configured to transmit a contention request via the transmitter during a contention period subsequent to one of the contention frames, when the device is ready to transmit a data frame comprising the data received via the data input. The device is configured to respond to receipt of a contention grant via the receiver by transmitting the data frame via the transmitter. The device is configured to respond to a lack of receiving a contention grant via the receiver during a contention period following transmitting the contention request, by implementing a delay prior to making a subsequent transmission of a contention request via the transmitter.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which:

FIG. 5 depicts a schematic diagram of an illustrative sequence of states for a remote, in accordance with an illustrative embodiment;

FIG. 6 depicts a schematic diagram of an illustrative sequence of states for an access point, in accordance with an illustrative embodiment;

FIG. 7 depicts a schematic diagram of an illustrative sequence of states for both an access point and a remote, in accordance with an illustrative embodiment;

FIG. 8 depicts a schematic diagram of an illustrative sequence of states for a remote, in accordance with an illustrative embodiment;

FIG. 9 depicts a schematic diagram of an illustrative sequence of states for both an access point and a remote, in accordance with an illustrative embodiment; and FIG. 10 depicts a schematic diagram of an illustrative sequence of states for both an access point and a remote, in accordance with an illustrative embodiment.

DETAILED DESCRIPTION OF THE INVENTION

Figure 1:
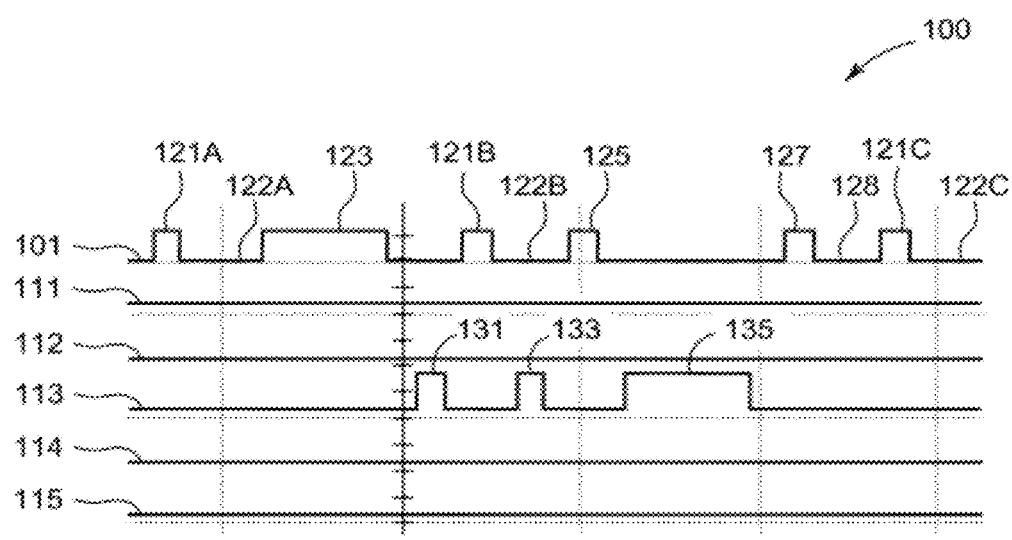
FIG. 1 depicts a signal timing diagram for an access point and multiple remotes, with an exploded section of the diagram for detail, in accordance with an illustrative embodiment.
Figure 2:
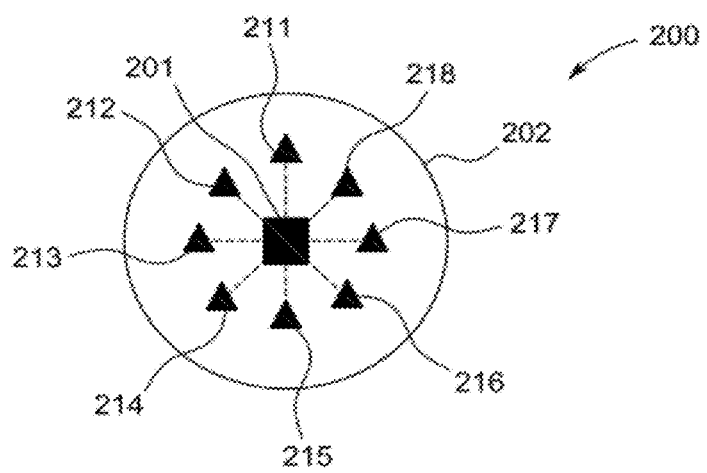
FIG. 2 depicts a schematic diagram of an access point and multiple remotes, in accordance with an illustrative embodiment.
Figure 3:
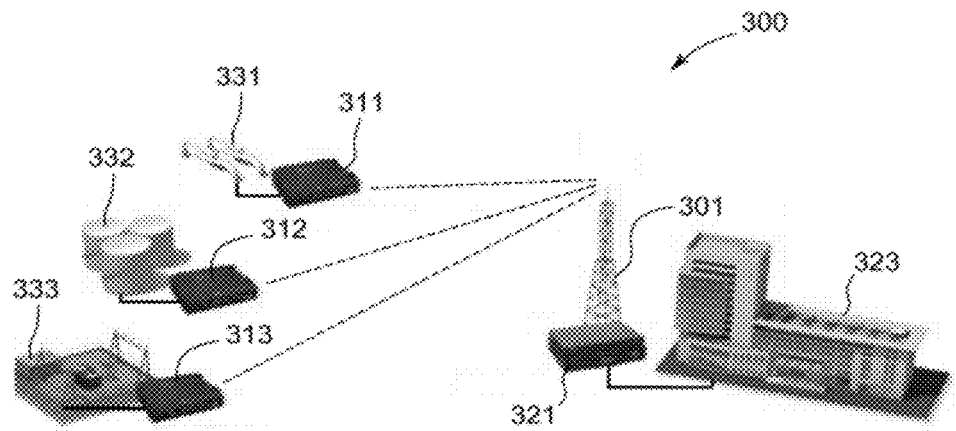
FIG. 3 depicts a diagram of an access point and multiple remotes, in accordance with an illustrative embodiment.

FIG. 1 depicts signal timing diagram 100 involved in an illustrative Contention Media Access Control (CMAC) system between an access point and multiple remotes, in accordance with an illustrative embodiment. A CMAC system may involve a contention-based media access control technique that is well-suited for low bandwidth half duplex licensed wireless radio networks, for example. FIG. 2 depicts a schematic diagram of a wireless communication system 200 that provides an illustrative context for the signals represented in signal timing diagram 100 of FIG. 1, showing RF coverage and network topology in a simplified example. FIG. 3 depicts a simplified diagram of a wireless communication system 300 that provides another illustrative context, with some additional illustrative detail, for the signals represented in signal timing diagram 100 of FIG. 1. Details of the illustrative wireless communication system 200 of FIG. 2 and of the illustrative wireless communication system 300 of FIG. 3 are useful for providing the context for the details of the illustrative CMAC system illustrated in FIG. 1.

A CMAC system involves a contention oriented media access technique that may be particularly advantageous for low bandwidth, half duplex, licensed wireless radio networks, in some illustrative embodiments. Low bandwidth wireless networks have particular problems that traditional media access techniques do not solve well. A CMAC system may provide channel access and reliable communications within a low bandwidth wireless network, in some illustrative embodiments. In some illustrative embodiments, a CMAC system may be particularly suitable for serial and IP networks in licensed low bandwidth frequencies such as 200 MHz, 400 MHz, 900 MHz, and 6.25 KHz-50 KHz channels, for example. Various embodiments of CMAC systems as disclosed herein may also be advantageously applied in high bandwidth channels or channels of any bandwidth and in either wired, wireless, or mixed settings.

The terms "CMAC" or "CMAC system" may refer to any aspect of any of a variety of systems, methods, and devices described and depicted in this disclosure in accordance with a wide variety of embodiments. A CMAC system may involve communication among radio devices that include an access point and one or more remotes. An access point may also be referred to as a "master station access point" or a "master access point", and a remote may also be referred to as a "wireless remote". An access point and one or more remotes may collectively be referred to as "radios".

One illustrative objective of a CMAC system is ensuring channel access for the radios involved, including both an access point and one or more remotes. An RF channel is a broadcast medium. At any given time if more than one radio transmits within range of another radio on the same frequency, the transmissions will collide and it is possible for data to become corrupted. A CMAC system coordinates when radios can attempt to acquire a channel in order to avoid collisions. Licensed radio networks may typically employ either a single frequency for both transmitting and receiving, or a switch carrier plan with one unique frequency for transmitting and a second unique frequency for receiving. This provides limitations on the type of media access technique that may be useful with the communication system. Additionally, the radios may be half duplex, which does not support simultaneous transmit and receive operations, and which provides a lower cost.

As depicted in FIG. 2, wireless communication system 200 may include an access point 201 associated with a master station, and multiple remotes 211, 212, 213, 214, 215, 216, 217, and 218, in accordance with an illustrative embodiment. Wireless communication system 200 provides one illustrative context of usage, in which access point 201 has a communicative range that extends to coverage edge 202. Each of the remotes 211, 212, 213, 214, 215, 216, 217, and 218 are contained within the RF coverage area of access point 201 within the interior of coverage edge 202, in this illustrative embodiment. Each of the remotes 211, 212, 213, etc. has a direct line of sight connection with access point 201, in this illustrative embodiment.

Wireless communication system 200 has a centralized network topology, in which there is a single access point and any number of remotes. Access point 201 can communicate to each of the remotes 211 through 218 and vice versa. However, the remotes 211 through 218 cannot communicate with each other, in this illustrative embodiment. Access point 201 may be the gateway to a local network and to outside networks, and the remotes 211, 212, 213, etc. may typically be connected to end devices, examples of which are shown in the illustrative embodiment of FIG. 3. Each of the radios within the single RF network bounded by coverage edge 202, i.e. the access point 201 and each of the remotes 211 through 218, may have a unique identifying address.

While eight representative remotes, including remotes 211 through 218, are depicted as part of wireless communication system 200 in FIG. 2, other wireless communication systems may include one, ten, fifty, three hundred, or any number of remotes in communication with a single access point, for example. Additionally, while only one access point is depicted in the wireless communication system 200 of FIG. 2, other wireless communication systems may include any number of access points, for example.

As depicted in FIG. 3, wireless communication system 300 includes an access point 301 and multiple remotes 311, 312, 313, in accordance with another illustrative embodiment. Wireless communication system 300 provides an illustrative context of usage, in which access point 301 has a communicative link with a master station 321 which in turn has a communicative link with a data control center 323. In this illustrative embodiment, the remotes 311, 312, 313 illustratively connect to oil or gas wells and associated processing, transporting, and storing infrastructure. Remote 311 has a communicative link with fluid transport pipes 331; remote 312 has a communicative link with fluid tanks 332; and remote 313 has a communicative link with processing plant 333. While three representative remotes are depicted as part of wireless communication system 300 in FIG. 3, other wireless communication systems may include one, ten, fifty, three hundred, or any number of remotes in communication with a single access point, for example. The number of remotes in the communication system is only limited by the available bandwidth of the access point. Additionally, while only one access point is depicted in the wireless communication system 300 of FIG. 3, other wireless communication systems may include multiple access points, for example. While this illustrative example involves remotes that relay data from oil and gas infrastructure, this is merely one example from among a wide range of contexts in which a CMAC communication system may be used.

In each of these cases, the remotes 311, 312, 313 may be communicatively linked to any one or more of various sensors, programmable logic controllers (PLCs), remote terminals units (RTUs), or other elements associated with the respective assets. For example, remote 311 may be communicatively linked to elements that provide data on valve positions and flow rates associated with transport pipes 331; remote 312 may be communicatively linked to elements that provide data on tank levels, temperatures, and pressures associated with fluid tanks 332; and remote 313 may be communicatively linked to elements that provide data on meters, alarms, and security sensors associated with processing plant 333. This is an illustrative example only, and in other embodiments, remotes may be communicatively linked with any type of equipment, sensors, or other elements.

Returning to signal timing diagram 100 of FIG. 1, master signal 101 represents the signal that may be associated with an access point such as access point 201 of FIG. 2, for example. Master signal 101 may be similarly applicable to access point 301 of FIG. 3 or another access point. Remote signals 111, 112, 113, 114, and 115 represent signals that may be associated with remotes such as remotes 211, 212, 213, 214, and 215 of FIG. 2, for example. Any of remote signals 111, 112, 113, 114, and 115 may be similarly applicable to any of remotes 311, 312, 313 of FIG. 3 or other remotes. The particular number of signals represented in signal timing diagram 100, of depicting five remote signals, is merely an arbitrary choice for this example. For each of the remote signals 111, 112, 113, 114, and 115, a logic low represents that the remote is receiving, while a logic high represents that the remote is transmitting. Master signal 101 and remote signal 113 perform various transmissions in the signal timing diagram 100 of FIG. 1, while remote signals 111, 112, 114, and 115 remain in a logic low position, representing that they are receiving signals only, throughout the time period represented in FIG. 1. For purposes of further discussion, master signal 101 may be identified as being associated with access point 201 of FIG. 2, and remote signal 113 may be identified as being associated with remote 213 of FIG. 2.

Master signal 101 spends some of its time sending transmissions, often at regular intervals, of signals known as contention frames. These contention frames include the logic high positions indicated as contention frames 121A, 121B, and 121C within the signal timing diagram 100, as well as acknowledge frame 127, which also doubles as a contention frame. Each of the contention frames 121A, 121B, 127, 121C defines a period of time after it, known as a contention period or a contention window, specifically at contention periods 122A, 122B, 128, 122C respectively. The contention frames 121A, 121B, 127, 121C signal to the remotes when the contention periods 122A, 122B, 128, 122C are defined. The contention periods define the periods of time allotted to the remotes to send a signal frame called a contention request, such as contention request 133 as explained below, back to the access point, to seek permission to communicate further with the access point, if an individual remote has a data frame ready to communicate back to the access point.

For a modem according to one illustrative embodiment, the contention periods 122A, 122B, 128, 122C may have a period of time of about 13 milliseconds (ms), for example, and in another illustrative embodiment, the contention periods may have a period of time of about 4 ms, for example, though any period of contention period may be used in other embodiments, whether shorter, longer, or within the range of these two examples.

Master signal 101 and remote signal 113 also include some additional features that are highlighted within the exploded portion of the diagram. When the access point has data to send, it may send a data frame 123 instead of a contention frame, for example. The access point may wait until after an empty contention period, when it doesn't receive any contention requests, to send a data frame, in an illustrative example. The period of time after contention frame 121A and before data frame 123 defines a contention period, but the period of time after data frame 123 and before contention frame 121B does not define a contention period, since it's not preceded by a contention frame. A contention period may be defined in terms of a selected duration of time after a contention frame, regardless of what type of transmission is made after the contention period or how long the access point goes without making another transmission after a contention frame. A remote may respond to receiving a data frame by subsequently transmitting an acknowledge frame 131 acknowledging receipt of the data frame 123, for example.

Remote signal 113 from remote 213 also includes a contention request 133, transmitted from remote 213 during the contention period following contention frame 121B. Remote 213 may be configured to have an address that uniquely identifies remote 213 from among all the remotes, as indicated above. Remote 213 may also be configured such that one of the contention requests, such as contention request 133, comprises the remote's address and an amount of data in a pending data frame that remote 213 has ready to transmit. The remote's address and the indication of the amount of data in its pending data frame may be encoded as part of the signal making up the contention request, in this illustrative example.

The access point 201 may respond to contention request 133 by transmitting contention grant 125, specifically addressed to remote 213. That is, the access point 201 may be configured such that contention grant 125 comprises an address of a designated one of the remotes, such as remote 213, for which the contention grant is indicated, and an amount of data in a pending data frame the designated remote is permitted to transmit, in this illustrative example. So, while all remotes in the wireless communication system 200 may receive contention grant 125, only remote 213 will detect that contention grant 125 is specifically addressed to it, while all other remotes that receive contention grant 125 will detect that it is not addressed to them, and they know not to respond to it. Remote 213 may respond to contention grant 125 by subsequently transmitting data frame 135. Access point 201 may receive data frame 135 and subsequently transmit acknowledge frame 127. Acknowledge frame 127 informs remote 213 that access point 201 successfully received data frame 135. Acknowledge frame 127 may also double as a contention frame, thereby defining another contention period after it. All remotes in the system may receive acknowledge frame 127, and all of the remotes may detect that it also serves as a contention frame defining a new contention period for a selected duration of time after it, while remote 213 additionally detects that it indicates successful receipt of the data frame 135 that remote 213 had transmitted.

The contention frames, contention requests, contention grants, data frames, and acknowledge frames, may all be defined in different ways in different embodiments. In some illustrative embodiments, each of these types of frames may be defined in terms of radio transmission packets with selected signal coding protocols, examples of which are further described below.

The CMAC technique of the access point transmitting contention frames defining subsequent contention periods, and the remotes transmitting contention requests during the contention periods, is a way of organizing an orderly protocol for the remotes to transmit data to the access point one at a time, in reserved slots, without trying to transmit data at the same time and creating interference or corruption of their data transmissions. The CMAC system is event-driven, always with one step after another in a well-defined set of possibilities, in an illustrative example, as opposed to other communication systems such as IEEE 802.11, for example, which is random in that any remote unit may request a channel at any random point in time. Since there is no way for each remote to know whether any of the other remotes in the system may try to transmit to the access point at the same time, the CMAC system removes the occurrence of such collisions or interfering transmissions to transmissions of signal frames only, in the form of the contention requests, and away from transmissions of actual data. One illustrative advantage of such an event-driven control technique is a reduced bandwidth footprint relative to a carrier sense system. A CMAC system may provide contention periods without carrier sense and instead entirely on an event-driven basis, defined by contention frames transmitted by an access point, in this illustrative example.

A CMAC system may include features that ensure fairness among the multiple remotes in a communication system. The technical concept of "fairness" in a CMAC system involves ensuring that each of the remotes has a "fair" chance to transmit data to the access point. That is, that none of the remotes is favored over any other; and that, while to some extent the remotes compete with each other to be heard by the access point and the competition among them is probabilistic, each of the remotes will get the chance to transmit its data to the access point without excessive delay.

For example, if two or more remotes both transmit contention requests in the same contention period, so that the contention requests have a collision, the access point may select randomly among all the contention requests received in the same contention period, and transmit a contention grant to the randomly selected remote. Therefore, in an illustrative method of operating an access point and a plurality of remotes, the access point may be configured for selecting a selected remote from among a first remote and a second remote if the access point receives contention requests from both the first remote and the second remote during a contention period, and the access point may be further configured for transmitting a contention grant only to the selected remote after the contention period, in this illustrative example. Similarly, if the access point receives contention requests from any number of remotes during a contention period, the access point may be configured for selecting a selected remote from among all the remotes from which it receives contention requests. If the access point receives one contention request during one of the contention periods, then the access point may transmit a contention grant from the access point to one of the remotes having an address indicated in the one received contention request, while if the access point receives more than one contention request during one of the contention periods, then the access point may select one of the remotes having an address indicated in one of the received contention requests, and transmit a contention grant from the access point to the selected remote, in this illustrative example. As a further example, if two remotes transmit at the same time but one is much nearer the access point and/or has an unobstructed line of sight while the other remote has obstructions in its line of sight to the access point, one remote may be able to deliver a much stronger signal to the access point and threaten to consistently outcompete the much weaker signal from the other remote. However, a CMAC system may include an algorithm to correct for this, and read all detectable incoming signals from all the remotes and then prioritize equally among them all. As another example, if two remotes transmit at the same time but one remote is inherently favored due to signal strength, the CMAC may include an algorithm where the last granted remote must wait a random number of contention periods before requesting again, thereby providing ample opportunities for remotes with weaker signals to successfully have their contention requests recognized and selected by the access point.

In a CMAC system, when the access point randomly selects one of the remotes to transmit a contention grant to, the other remotes that sent competing contention requests during that contention period may engage a "backoff", i.e. a number of contention periods to wait before attempting another contention request. That is, a remote may be configured to respond to a lack of receiving a contention grant via the receiver during a contention period following transmitting the contention request, by implementing a delay of a selected number of contention periods prior to making a subsequent transmission of a contention request via the transmitter. This is done instead of each remote with data ready to send transmitting a contention request during every consecutive contention period until it receives a contention grant, which would impose a higher burden on the processing, transmitting, and energy consumption of the remotes as well as the bandwidth, processing, and energy consumption of the access point. If a remote continues not receiving a contention grant in response to consecutive contention requests, the remote may impose an increasingly long backoff period prior to each subsequent contention request. Therefore, a first remote may be configured to implement a first delay before transmitting a subsequent contention request, if the first remote transmits a contention request and does not receive a contention grant after the contention period during which it transmitted the contention request, and the first remote may be further configured to implement an additional delay before transmitting an additional subsequent contention request, if the first remote transmits a subsequent contention request and does not receive a contention grant after the contention period during which it transmitted the subsequent contention request, in this illustrative example.

One option for calculating this additional delay is to use exponential backoffs, in which each remote imposes an exponentially increasing backoff period before each subsequent contention request. The first remote may be configured to exponentially increase each additional delay before each additional subsequent contention request, until the first remote receives a contention grant, in this illustrative example. In this example, the device is configured to respond to a lack of receiving a contention grant via the receiver during additional contention periods following re-transmitting contention requests, by exponentially increasing the selected number of contention periods of the delay prior to making a subsequent transmission of a contention request via the transmitter. However, in contexts of narrowband channels and large numbers of remotes, exponential backoffs may lead to excessive delays. Another option is to use linear backoffs, in which each remote imposes a linearly increasing backoff period before each subsequent contention request. The first remote may be configured to linearly increase each additional delay before each additional subsequent contention request, until the first remote receives a contention grant, in this illustrative example. In this example, the device is configured to respond to a lack of receiving a contention grant via the receiver during additional contention periods following re-transmitting contention requests, by linearly increasing the selected number of contention periods of the delay prior to making a subsequent transmission of a contention request via the transmitter. Linear backoffs tend to promote limited delays and efficient sharing of bandwidth in contexts of narrowband channels and large numbers of remotes. In other contexts, that involve either relatively few remotes and/or greater bandwidth, exponential backoffs may also be advantageously used in CMAC systems.

Figure 4:
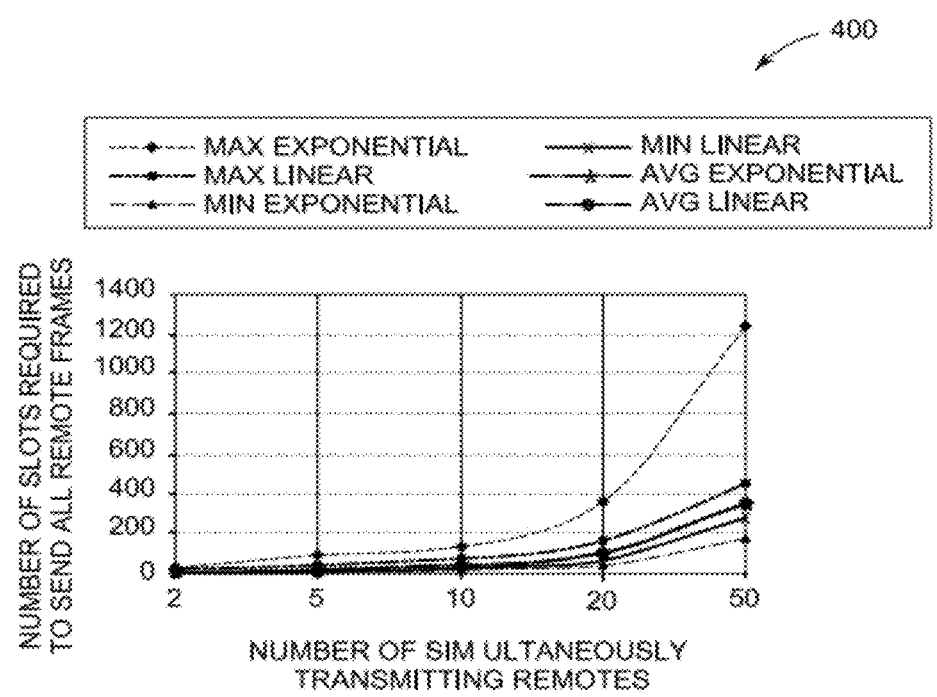
FIG. 4 depicts a graph comparing the number of slots required for sending all remote frames with the number of simultaneously transmitting remotes in different scenarios, in accordance with an illustrative embodiment.

FIG. 4 depicts a graph 400 that demonstrates an illustrative comparison between a CMAC communication system using linear backoffs versus exponential backoffs. In particular, graph 400 depicts the number of slots required for sending all remote frames with the number of simultaneously transmitting remotes in different scenarios, in accordance with an illustrative embodiment, in which the scenarios are based on the minimum, the average, and the maximum number of slots required to send the data frames from all the remotes in a CMAC communication system, in systems that use either exponential backoffs versus linear backoffs.

FIGS. 5 through 10 each depict a schematic diagram of an illustrative sequence of states for an access point and/or a remote, in accordance with various illustrative embodiments. Additional details of the CMAC system are described as follows in conjunction with FIGS. 5 through 10. As noted above, a CMAC system may coordinate channel access through the use of signal frames. Signal frames are special radio packets that the CMAC uses for passing signaling information for the purpose of channel access between the point and the remotes, in an illustrative example. In addition to signal frames, a CMAC system may also support data frames to pass non-CMAC information between radios. Table 1 shows a summary of signal frames that support CMAC functionality:

TABLE 1

CMAC frames types and descriptions.

| Frame Type | Master Initiated | Remote Initiated | Description |
| --- | --- | --- | --- |
| Contention Frame (CF) | X | | Frame alerts remotes of upcoming contention period. May contain information with regards to the type of contention period, slotted or immediate. May also contain a bit within the frame that may be reserved for downstream acknowledgment purposes. |
| Contention Request (CR) | | X | Frame alerts access point that remote is requesting access to the channel. A CR may include the requesting radio's address, and how many bytes of data the radio wishes to transmit. |
| Contention Grant (CG) | X | | Frame alerts remote that it has been granted access to the channel. A CG may include the granted remote's unit address, and how many bytes the requesting remote is allowed to transmit, for example. |
| Data Frame (DF) | X | X | Frame used to pass payload data from access point to remote or from remote to access point. Frame may include among other things source and destination addresses, and a frame sequence number, for example. |
| Acknowledge Frame (ACK) | X | X | Frame used to acknowledge successful receipt of a DF, and may contain a destination address and acknowledgment sequence number, for example. |

The signal frames of a CMAC protocol may comprise contention frames (CF), contention request frames (CR), contention grant frames (CG), and acknowledge frames (ACK), in this illustrative example. These frames may be sent frequently, passing CMAC information between access point and remotes. These frames may all be the same size and have a small memory footprint, which may be advantageous for low bandwidth networks. The data frames (DF) are outside of the CMAC protocol per se, and include the actual data transmissions that the CMAC system is intended to support, in this illustrative example.

DFs are sent less frequently, and are used to send non-CMAC data between radios. The CMAC system is responsible for the reliable transfer of DFs to and from remote units. The CMAC system implements a priority DF queue for quality of service. The CMAC can queue multiple DFs but must control when the DFs can be sent. To accomplish this, the access point controls the sending of signal frames, and remotes act based on the received signal frames from the access point. A remote can only send a data frame after being given permission (through a contention grant signal frame) by the access point, to avoid collisions between data frames from multiple remotes.

The access point controls channel access by signaling remotes when they are allowed to contend for the channel through the use of the CF signal frame. The CF signal frame alerts remotes of an upcoming contention period (CP) immediately following receipt of the frame. A contention period is a window of time where any remote may contend for access to the channel to send a DF upstream. If a remote has a DF to send upstream to the access point, it can send a CR signal frame requesting the channel. If the access point wishes to grant said remote the channel, the access point will respond with a CG signal frame. The remote is then free to send its DF upstream to the access point.

For downstream communication from access point to remote, the access point simply inserts a DF before a CF and after a contention period. Since remotes cannot send during this time, the transmission is guaranteed not to collide with any remote transmission.

If the access point is not sending a downstream DF, or waiting for an upstream DF, the access point may continuously be sending CFs and looking to service any received CRs. There exists the possibility that the access point may receive multiple CRs during a single contention period. Because of this the access point may implement a CR queue, and therefore can service multiple requests.

In general, to send a DF upstream from a particular remote to the access point, the remote follows the proceeding set of rules:
1. Wait for a new CF to be received.
2. Wait for the appropriate time during CP and send a CR.
3. Wait for a CG or timeout.
4. If CG received specifically addressed to the particular remote, send pending DF and wait for ACK (optional).

FIG. 5 shows a schematic of an example upstream CMAC DF transaction, in an illustrative example. FIG. 5 depicts states of the access point (i.e. the master, as labeled in the figure) indicated in the upper row and states of a given remote indicated in the lower row. In the example of FIG. 5, first, an access point (i.e. the master, as labeled in the figure) transmits a contention frame (CF); then, a remote sends a contention request (CR) during a contention period; then, the access point transmits a contention grant (CG) addressed to the designated remote; then, the designated remote transmits a data frame (DF); finally, the access point may transmit an acknowledge frame (ACK), which may be incorporated together with a new contention frame.

To send a DF downstream from access point to remote, the access point may implement a scheduling algorithm to determine when a DF can be sent. The access point may schedule continuously per the proceeding algorithm:
1. Send CGs for queued CRs in accordance with a fairness algorithm. As noted above, a fairness algorithm provides that the access point ensures equal priority to all the remotes; a fairness algorithm also provides that upstream and downstream traffic is given an equal opportunity. For example, if the access point has a large queue of downstream DFs, the access point should occasionally send a CF instead of a DF to allow for upstream traffic. This means that the priority numbers above can and will change dynamically based on current network traffic conditions. A CR is de-queued as soon as a CG is sent to the remote from which that CR was received. Re-schedule after the access point receives a remote's upstream DF (and sending optional ACK) or timeout after not receiving any data within a configurable parameter setting.
2. Send any pending downstream DF in accordance with the fairness algorithm. Wait for ACK (optional). Re-schedule after the DF transmission has completed.
3. Send a CF, wait for the contention period, queue any received CRs, then re-schedule.

FIG. 6 shows an example of a downstream DF transaction, in which a CF is transmitted by the access point (i.e. the master, as labeled in the figure) which defines a subsequent CP, which remains idle, and is not met with any contention requests. Because the contention period went idle, the access point then sends a DF after the CP and before the next CF, in this illustrative example. In other implementations, such as if the access point has a data frame that is urgent to send, the access point may delay a contention frame to send a data frame even if the previous contention period was met with contention requests, for example.

A CMAC system may employ further techniques to address how to manage multiple incoming contention requests during the same contention period. A CMAC system may support two types of contention period methods, immediate and slotted. The contention period method is dynamic and controlled by the access point. That is, an access point may dynamically transition to slotted contention periods as needed, such as when faced with high traffic of incoming contention requests, and may engage immediate contention periods when incoming traffic of contention requests is low, for example.

For both immediate and slotted contention period methods, a concept of a "slot" may be used. A slot may be defined to be the maximum amount of time it takes to transmit a signal frame. This is dependent on the current modulation bit rate of the radio. For example, for a 10-byte signal frame and a modulation bit rate of 19200 Kbps, the time period for a slot may be defined in one illustrative example as:

$$\text{Slot} = (10 * 8 \text{ bits per byte})/19200 \text{ Kbps} = 4.2 \text{ ms} \qquad (1)$$

Each of these two contention period methods has a unique congestion control mechanism. For immediate contention periods, congestion detection and prevention is performed by the remotes. On the other hand, the access point performs congestion detection and prevention in slotted contention periods. In this context, "network congestion" or simply "congestion" may be considered to refer to a significant number of different remotes transmitting contention requests during the same contention periods, for example.

The contention period method that governs at any particular time may be controlled by the access point and relayed to the remotes via CF signal frames. Within a CF, there may exist a reserved field "slot size" that establishes the active CP method. A slot size of 0 may be used to set the current CP method to immediate contention periods, and any non-zero value may be used to set the current CP method to slotted contention periods.

In immediate contention periods, congestion control may be performed by the remotes. For example, each remote may store a backoff parameter and a collisions parameter, both of which may be initialized to 0. Assuming the remote has a pending DF to send, the remote may use the following set of rules, according to one illustrative example, to determine the current state of network congestion and the appropriate action to do:
1. If the backoff parameter is 0, then send a contention request (CR), otherwise decrement the backoff parameter by one.
2. If a contention request (CR) is sent and a contention grant (CG) is received, send the pending data frame (DF) and reset the backoff parameter and the collisions parameter to 0.
3. If a CR is sent, and a CG is not received within a timeout period, congestion may be assumed to be present. Increment the collisions parameter by one. Use the new value of the collisions parameter to determine a new random value for the backoff parameter. The CMAC system may, as an illustrative example, provide either or both of two different techniques for computing the new value of the backoff parameter. The CMAC system may involve algorithms implemented in a software program or module that may be written in a programming language such as C, for example, and these two techniques for computing the new value of the backoff parameter may for example be indicated in lines of code as follows, using a backoff parameter named "my_backoff" and a collisions parameter named "my_collisions":
Binary Exponential:
my_backoff=(rand( ) % (2^(my_collisions))
Linear:
my_backoff=(rand( ) % (my_collisions))

FIG. 7 shows an example of a remote implementing a backoff, after previously transmitting at least one contention request without receiving a corresponding contention grant. In the diagram of FIG. 7, states of the access point (i.e. the master, as labeled in the figure) are indicated in the upper row and states of a given remote are indicated in the lower row. This remote waits for its backoff parameter counter to expire and then send its upstream CR. That is, FIG. 7 depicts this remote implementing a random backoff in an immediate contention period method. The access point transmits a contention frame defining a subsequent contention period, in which the remote decrements its backoff counter, previously set at 3, to 2. The access point transmits another contention frame, and in the subsequent contention period, the remote again decrements its backoff counter, now from 2 to 1. The access point then transmits another contention frame, and in the subsequent contention period, the remote at hand decrements its backoff counter from 1 to 0 and transmits a new contention request. If this contention request is granted, this remote may transmit its pending data frame in the next contention period, while if this contention request is once again denied a contention grant, this remote will engage a new backoff period. That new backoff period may be increased from the previous one, and may be increased by a linear amount, or by an exponential amount, in various embodiments.

Unlike in the immediate contention period method, where the remotes detect congestion, in the slotted contention period method, the access point is responsible for detecting congestion. In slotted CP, the contention period is divided into multiple slots. For example, the access point may tally a number of contention requests received during the contention periods, and if the number of contention requests as tallied by the access point is above a selected threshold, then the access point may transmit a subsequent contention frame that defines a subsequent contention period divided into a plurality of slots. Each slot may be defined as a period of time equal to the slot size field of a contention frame, for example. Initially the slot size may default to a configurable minimum number of slots, which can be no less than one.

One of the remotes that has a pending data frame, in response to receiving the contention frame that defines the subsequent contention period divided into a plurality of slots, may select one of the slots in which to transmit a contention request. That is, upon receipt of a new CF with a non-zero slot size, a remote that has a pending DF to send upstream may pick a random slot it designates with a slot parameter within the contention period, and send a contention request within that randomly selected slot, in this illustrative example. This may for example be indicated in a line of code as follows, with a slot parameter named "my_slot":

my_slot=rand( ) % slot_size

FIG. 8 depicts an example of a slotted CP transaction, with states of the access point (i.e. the master, as labeled in the figure) indicated in the upper row and states of a given remote indicated in the lower row. In this illustrative example, the access point transmits a contention frame that defines the subsequent contention period as a slotted contention period with current slot size of 4. The one particular remote indicated in this example randomly selects the fourth slot in this contention period in which to transmit its contention request. While this example features a slotted contention period with four slots of time, other slotted contention periods may be implemented with any number of two or more slotted periods of time, in various embodiments. The access point may therefore be configured such that the contention frames comprise information on whether a subsequent contention period is to be immediate or slotted into two or more slotted periods of time, and a first remote may be configured for transmitting a contention request within either an immediate period of time or a selected slotted period of time after receiving the contention frame, to correspond to the information in the contention frame, in illustrative embodiments. That is, a remote may be configured to respond to a contention frame indicating a selected number of slots in a subsequent contention period, by selecting one of the selected number of slots in which to transmit the contention request. For instance, in the illustrative example depicted in FIG. 8, the selected number of slots in the subsequent contention period is four, and the remote selects one of the four slots, in this case the fourth one of the four slots, in which to transmit its contention request.

The current slot size in each CF may be determined by the access point using an algorithm that may detect and/or analyze congestion of communication signals. The algorithm may detect congestion by determining how busy the current CP is. The algorithm may, for example, use an energy detection function during each slot to determine if the slot was occupied or not. The ratio of the number of occupied slots to total number of slots may be used as a congestion metric. If this ratio exceeds a configurable threshold, then a congestion condition has occurred. For example, if a contention period is defined to have four slots and the threshold is set to 50%, and either three or four slots were detected as occupied, the access point may identify a congestion condition and may increase the current slot size being used in the network to accommodate for the congestion. This may allow more slots for remotes to contend for, allowing more remotes to be serviced. If subsequent contention periods are evaluated to be uncongested, the slot size may be decreased, and may be decreased steadily until it is returned to immediate contention periods, i.e. contention periods defined with only a single slot, in this illustrative example.

Any of a variety of methods may be used to increase or decrease the current slot size in response to rises and falls in network congestion. In one illustrative example, a CMAC system may use a binary exponential increase and decay function, for example. The function is based upon a congestion parameter kept by a CMAC access point that is initially set to 0. Before a new CF is sent, the access point may determine the current slot size for the CF using the congestion parameter. Any time congestion is detected, the congestion parameter may be incremented. Alternatively, any time congestion is not detected, the congestion parameter may be decremented down to a minimum possible value of 0. The current slot size may for example then be set per the following illustrative lines of code, with the congestion parameter named "my_congestion":

```
slot_size = 2^(my_congestion)
if ( slot_size < min_slot_size) {
    slot_size = min_slot_size
}
```

Not all radio configurations may support the energy detection function that may be required for slotted CP as in this illustrative example. A CMAC system may have the ability to automatically detect which CP method it can use by correlating received frames and detected energy during the CP. If energy is detected and frames are received during the CP, the access point may then enable slotted contention. If frames are received but no energy is detected during the CP, the access point may not allow slotted CP, in this example. Since it does not require energy sense functionality, immediate CP may always be supported by all radio configurations and therefore may be the default operating mode of the CMAC unless configured otherwise, for example.

Different contention period methods may have different advantages in different contexts of usage. Immediate CP has a lower possible latency and may be particularly well suited for time-critical applications. On the other hand, slotted CP may be particularly advantageous during periods of heavy load because of the dynamic slot size and the possibility of queuing multiple CRs during a single CP. In various other contexts, other design factors and constraints may also extend the advantages of either protocol in other operating contexts.

A CMAC system may also support acknowledge frames as an optional acknowledgment facility, to help ensure reliability of the communications. An acknowledge frame is a signal frame that indicates recognition of successful receipt of a data frame. Acknowledgments may be optional in different embodiments because they consume some additional bandwidth, which may be at a premium in low bandwidth network contexts. In an illustrative embodiment, whether or not acknowledge frames are used may be manually configurable or automatically configured based on factors that compare factors such as bandwidth limitations versus network reliability and criticality of confirming receipt of data frames.

If acknowledge frames are used, there may be a facility for the access point and/or the remotes to gather confirmation of acknowledge frames in response to transmission of a data frame, and taking some action if an expected acknowledge frame is not received. For example, an access point and/or a remote may maintain a copy of a data frame after transmission and wait at least until after an acknowledge frame specific to that data frame is received before emptying that data frame from its own cache or other memory resource. An access point and/or a remote may also respond to failure to receive an expected knowledge frame by queueing the corresponding data frame for re-transmission and transmitting a new contention request to try to reserve a new time to re-transmit the data frame, for example.

Each data frame may be encoded to contain a source address, a destination address, and an incrementing sequence number that may be used to uniquely identify a DF. Following reception of a DF, either the access point or a remote may send an ACK frame back to the original source derived from the source address of the DF. The access point and the remotes may therefore be configured to transmit an acknowledge frame after receiving one of the data frames. One of the acknowledge frames may comprise source and destination addresses and an acknowledgment sequence number, for example. A CMAC system may retain a database of each radio, either access point or remote, it has communicated with and record the last sequence number it received from each radio, in an illustrative example. When a new DF is received for a radio, either access point or remote (filtered by destination address), the database entry of the last recorded sequence number may be compared to the sequence number in the DF. If the sequence numbers match, the DF may be assumed to be a re-transmission and may be discarded. However, if acknowledgments are enabled an ACK for that frame is generated. If the sequence numbers do not match, the DF is considered valid and the sequence number or the source radio may be updated in the database. The database may be implemented using any of a variety of database management systems, database query languages, and/or other tools.

Acknowledgments functionality can be split into two separate parts, upstream and downstream. FIG. 9 depicts a sequence of states for a downstream acknowledgment example. For downstream transactions from access point (i.e. the master, as labeled in the figure) to a remote, acknowledgments may follow the sequence shown in FIG. 9. As depicted in FIG. 9, after the access point has transmitted a contention frame and after the corresponding contention period, the access point may transmit a data frame DF. After the DF is sent by the access point, the remote may transmit an ACK signal frame back to the access point. The access point may wait for the ACK frame to arrive before a timeout period. If the ACK signal frame is not received, the access point may re-transmit the DF at its next opportunity.

For upstream transactions, a CMAC system may implement an acknowledgment system that may conserve bandwidth. This may be accomplished by taking advantage of the sequential nature of the CMAC. In the example discussed above, in downstream acknowledgments, the ACK frame immediately follows a DF. Upstream acknowledgments could simply follow this model as well, in one example. In another illustrative example, there is a way to take advantage of the access point-remote relationship and insert acknowledgments without the use of the ACK frame. According to an illustrative embodiment of the CMAC scheduling algorithm, after receipt of an upstream DF, the access point may be guaranteed to send a CF, a CG or a DF as the next downstream frame. Within each of these frames there may be a reserved Boolean bit flag "DS_ACK". If this bit is set, it means the access point is acknowledging the last received DF that was sent upstream. The last remote that sent a DF upstream can look for this bit to verify the transaction was successful. The "DS_ACK" bit may have a one to one relationship for the last received frame. The "DS_ACK" bit cannot span multiple frames, it may be cleared immediately after sending the next downstream CF, CG or DF frame, in this illustrative example.

FIG. 10 depicts a state sequence for this illustrative example of an upstream acknowledgment. As shown in FIG. 10, the access point (i.e. the master, as labeled in the figure) may transmit a contention grant to an addressed remote, and the remote may transmit its data frame. The access point may respond by transmitting a new contention frame, but one that includes a DS_ACK bit set to 1, indicating acknowledgment of receipt of the immediately preceding data frame. This intelligent acknowledgment system conserves bandwidth by defining a new subsequent contention period immediately following the same frame as the acknowledge frame, thereby removing the need to send a separate ACK signal frame for upstream transactions. This provides decreased latency and increased bandwidth efficiency, both of which may typically be important factors to consider in low bandwidth networks.

The access point and the remotes may each be controlled by an embedded processing unit and/or other computing resources, for example. In one illustrative example, each of the remotes may be controlled by an embedded processor. The CMAC system may include software programmed in C and loaded onto the embedded processor of each of the remotes in a system. A wide variety of other processors and computing elements may be used in other examples to control the access points and remotes. Additionally, a CMAC system or individual aspects of it may also be programmed in any of a wide variety of other languages, such as C, C++, C#, Objective C, Java, Scala, Python, Ruby, Haskell, Common Lisp, or Clojure, for example. A CMAC system may also use any of a wide variety of database architecture, database management system, and database query language. For example, a CMAC system may use any variation of a SQL database query language, such as those conforming to the ISO/IEC 9075 standard.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    an access point configured for receiving signals, and configured for transmitting signals comprising contention frames, contention grants, and data frames; and
    one or more remotes each configured for receiving signals, and configured for transmitting signals comprising contention requests and data frames;
    wherein the one or more remotes having a pending data frame are each configured for transmitting a contention request to the access point within a selected period of time after receiving one of the contention frames from the access point;
    wherein the access point is configured for tallying a number of the contention requests received during the contention period and, if the number of the tallied contention requests exceed a selected threshold, transmitting a second contention frame that defines a second contention period that is divided into a plurality of slots; and
    wherein the one or more remotes having a pending data frame are configured to select one of the slots in which to transmit a second contention request.

2. The system of claim 1, wherein the access point is further configured for transmitting an acknowledge frame to a first remote after receiving a data frame from the first remote.

3. The system of claim 2, wherein the first remote is configured for transmitting an acknowledge frame to the access point after receiving a data frame from the access point.

4. The system of claim 1, wherein the selected period of time after receiving one of the contention frames defines a contention period, and wherein the access point is further configured for selecting a remote from among the one or more remotes if the access point receives contention request from the one or more remotes during the contention period, wherein the access point is further configured for transmitting a contention grant only to the selected remote after the contention period.

5. The system of claim 4, wherein the one or more remotes are each further configured to implement a first delay before transmitting a subsequent contention request, if the one or more remotes transmit a contention request and do not receive a contention grant after the contention period during which the contention request was transmitted.

6. The system of claim 5, wherein the one or more remotes are each first remote is further configured to implement an additional delay before transmitting an additional subsequent contention request, if the one or more remotes transmit subsequent contention request and do not receive a contention grant after the contention period during which the subsequent contention request was transmitted.

7. The system of claim 6, wherein the one or more remotes are each further configured to linearly increase each additional delay before each additional subsequent contention request, until the one or more remotes receive a contention grant.

8. The system of claim 6, wherein the one or more remotes are each further configured to exponentially increase each additional delay before each additional subsequent contention request, until the one or more remotes receive a contention grant.

9. The system of claim 1, wherein the access point is further configured such that the contention frames comprise information on whether a subsequent contention period is to be immediate or divided into the plurality of slots, and wherein the one or more remotes are each configured for transmitting its contention request within either an immediate period of time or within a selected one of the slots after receiving the contention frame, to correspond to the information in the contention frame.

10. The system of claim 1, wherein the one or more remotes are each further configured to have an address, and are each further configured such that one of the contention requests comprises an address of a first remote and an amount of data in a pending data frame the first remote has ready to transmit.

11. The system of claim 10, wherein the access point is further configured such that one of the contention grants comprises an address of a designated one of the remotes for which the contention grant is indicated and an amount of data in a pending data frame the designated remote is permitted to transmit.

12. The system of claim 10, wherein the access point and the one or more remotes are each further configured to transmit the data frames such that one of the data frames comprises source and destination addresses and a frame sequence number.

13. The system of claim 10, wherein the access point and the one or more remotes are each further configured to transmit acknowledge frames after receiving one of the data frames, such that one of the acknowledge frames comprises source and destination addresses and an acknowledgment sequence number.

14. A method of operating an access point and a plurality of remotes, the access point and the remotes being configured for receiving and transmitting signals, the plurality of remotes comprising a first remote and a second remote, the method comprising:
    transmitting a series of contention frames from the access point, defining contention periods between the contention frames;
    transmitting a contention request from the first remote during one of the contention periods;
    transmitting a contention request from the second remote during one of the contention periods;
    if the access point receives one contention request during one of the contention periods, then transmitting a contention grant from the access point to one of the remotes having an address indicated in the one received contention request;
    if the access point receives more than one contention request during one of the contention periods, then selecting one of the remotes having an address indicated in one of the received contention requests, and transmitting a contention grant from the access point to the selected remote;
    if one of the remotes receives a contention grant, then transmitting a data frame from that remote in a contention period subsequent to the contention grant;
    if one of the remotes does not receive a contention grant in a contention period subsequent to transmitting a contention request, then causing that one of the remotes to implement a delay prior to sending a new contention request, then transmitting a new contention request from that one of the remotes after passage of the delay; and the access point tallying a number of contention requests received during the contention periods, and if the number of contention requests is above a selected threshold, then the access point transmitting a subsequent contention frame that defines a subsequent contention period divided into a plurality of slots, and one of the remotes having a pending data frame, in response to receiving the contention frame that defines the subsequent contention period divided into a plurality of slots, selecting one of the slots in which to transmit a contention request.

* * * * *

UNITED STATES PATENT AND TRADEMARK OFFICE
CERTIFICATE OF CORRECTION

PATENT NO. : 8,681,699 B2  Page 1 of 1
APPLICATION NO. : 13/104603
DATED : March 25, 2014
INVENTOR(S) : Jeffrey Michael Wilczewski It is certified that error appears in the above-identified patent and that said Letters Patent is hereby corrected as shown below:

In the Claims:

Col. 17, in claim 6, Line 55, please remove the following text:

are each ~~first remote is~~ further configured to implement

Signed and Sealed this
Thirtieth Day of December, 2014

Michelle K. Lee
*Deputy Director of the United States Patent and Trademark Office*